UNITED STATES PATENT OFFICE.

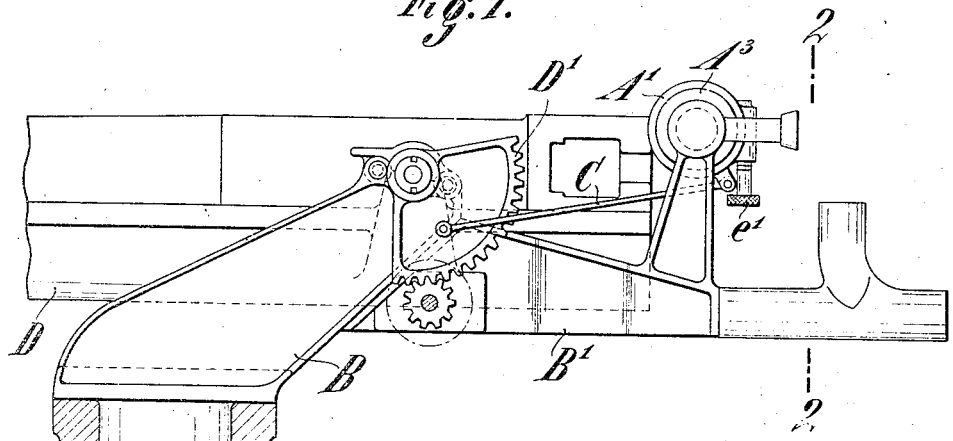
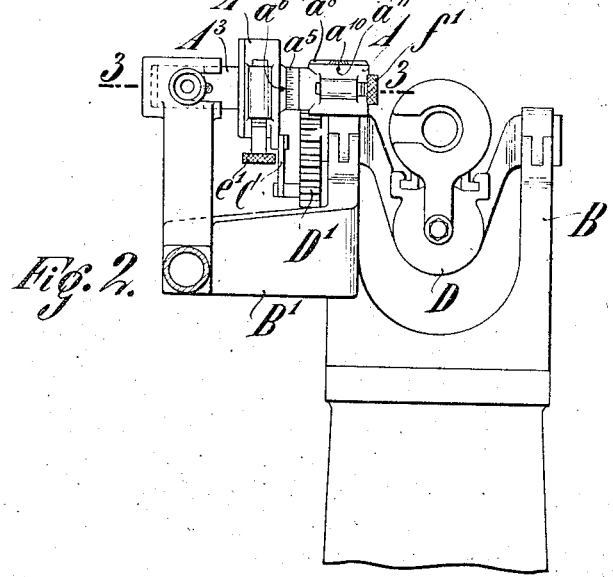

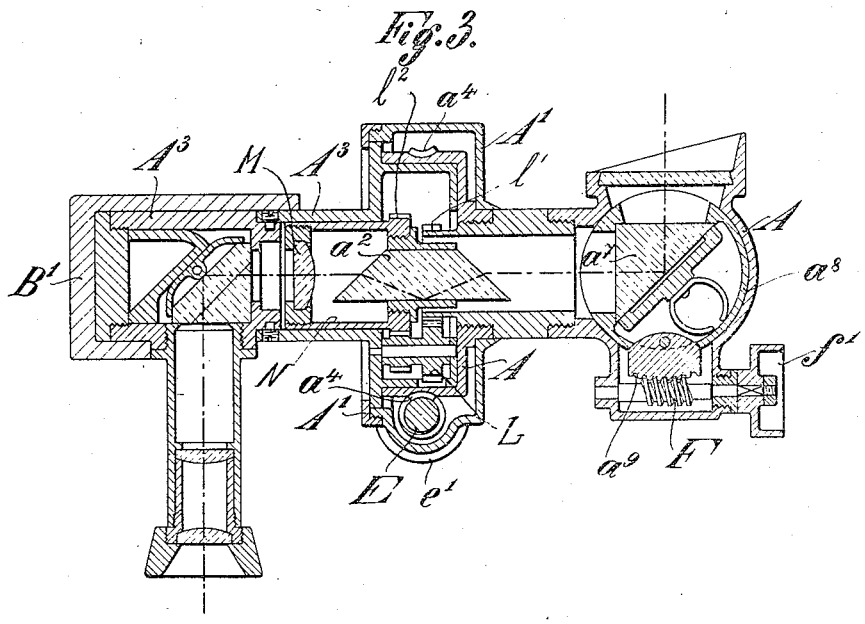
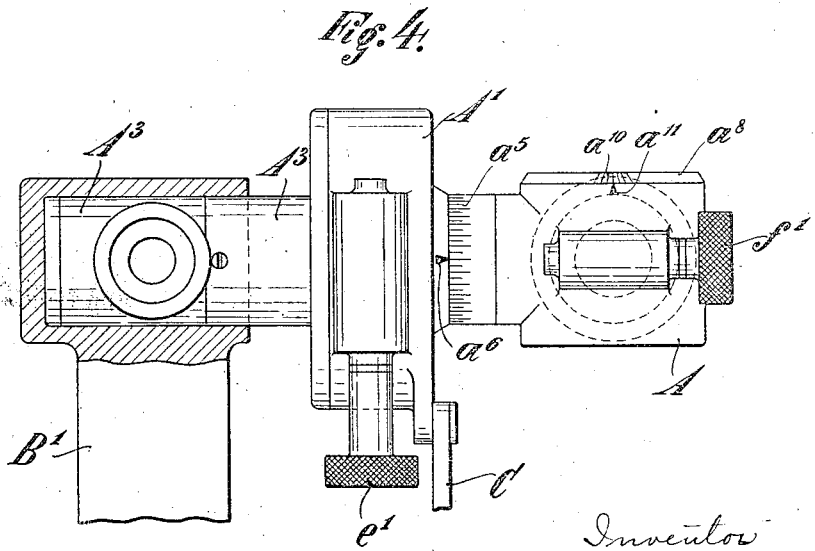

RICHARD SCHÜRMANN, OF ESSEN-ON-THE-RUHR, GERMANY, ASSIGNOR TO FRIED. KRUPP AKTIENGESELLSCHAFT, OF ESSEN-ON-THE-RUHR, GERMANY.

TELESCOPIC GUN-SIGHT.

1,188,844.

Specification of Letters Patent.   Patented June 27, 1916.

Application filed November 17, 1913.   Serial No. 801,496.

*To all whom it may concern:*

Be it known that I, RICHARD SCHÜRMANN, residing at Essen-on-the-Ruhr, Germany, a subject of the Emperor of Germany, have invented a certain new and useful Improvement in Telescopic Gun-Sights, of which the following is a specification.

This invention relates to improvements in telescopic gun sights.

In the accompanying drawings is illustrated one embodiment of the invention and Figure 1 shows a side view partly in section of the sighting device with some of the parts of the gun carriage; Fig. 2 a rear view of Fig. 1; Fig. 3 a section of Fig. 2 along lines 3—3, seen from above and in larger scale; and Fig. 4 a rear view corresponding to Fig. 3.

This sighting device is provided with a panoramic sight which, in well known manner, is arranged in lying position. The panoramic sight is constructed in such a manner, that on the one hand the reflector housing A is revoluble relatively to a central housing portion $A^1$ and rotatable simultaneously in relation to the erecting prism $a^2$, see Fig. 3, and can be locked in various angular positions, and that on the other hand the central housing portion $A^1$ is freely revoluble relatively to the housing portion $A^3$ which carries the eye-piece tube around an axis, which coincides with the axis of revolution of the reflector casing A. The erecting prism $a^2$ and the objective M are both fixedly secured in a carrier N, rotatably mounted in the outer housing portion $A^3$. By means of gear wheels L, $l^1$ and $l^2$, Fig. 3, the carrier N is connected with the reflector housing A in such a manner that, when the reflector $a^7$ is rotated, the erecting prism $a^2$ and the objective M rotate in the same direction but at only half the angular speed. This arrangement is known to be old and not claimed in the present case. The housing portion $A^3$ is rigidly connected with an arm $B^1$ (rigidly secured to the gun carriage B) in such a manner, that the axis of revolution of the central housing portion $A^1$, and the axis of the reflector housing A, coinciding with the first-named axis, are parallel with the axis of the trunnions of the gun carriage. The central housing portion $A^1$ of the panoramic sight is connected, by means of a link C, with the toothed segment $D^1$ of a sector elevating gear in such a manner, that a link parallelogram $A^1$, C, $D^1$, D, B $B^1$ $A^3$, is formed; and that therefore the central housing portion $A^1$ of the panoramic sight will partake in each movement, at the same angular velocity and in the same direction, as that given to the cradle D together with the gun barrel, by means of the elevating gear. The toothed arc $D^1$ forming part of the elevating gear is rigidly secured on the cradle D.

Between the central housing portion $A^1$ of the panoramic sight and the reflector housing A is inserted in well known manner a self-locking worm gear E $a^4$, see Fig. 3, which is provided with a hand wheel $e^1$, by means of which the reflector housing A may be revolved, relative to the central housing portion $A^1$, in the vertical plane. Through this arrangement it will be possible to give an inclination of the sight line relative to the gun axis that corresponds to the range. To read off the given setting of the sight line as above indicated is provided a range scale $a^5$ on the reflector housing A and a mark $a^6$ engraved on the central housing portion $A^1$. The objective reflector $a^7$, see Fig. 3, which is mounted to be adjusted in the reflector housing A around an axis perpendicular to the axis of revolution of the reflector housing may be swung a certain angle each side of its middle position, by means of a worm F carrying a hand wheel $f^1$, which worm is in mesh with worm teeth $a^9$ on the cover $a^8$ of the reflector $a^7$. As the sight line thus can be moved in a plane perpendicular to the elevating plane, this arrangement enables any necessary sidewise displacements to be taken account of. The magnitude of the necessary displacements may be read off on a scale $a^{10}$ arranged on the cover $a^8$ by means of a mark $a^{11}$ situated on the reflector housing A.

The manner of aiming a gun provided with the described sighting device will be evident from the above given description, and need therefore not be further discussed. It will be sufficient to say, that the central housing portion A¹ corresponds to the sight-bar adjusting socket and that the reflector housing A corresponds to the elevating bar of an ordinary sighting device, because the central housing portion A¹ in the vertical direction only moves in conjunction with the gun barrel.

As will be evident from the above description, the principal advantage of the present sighting device over other known sighting devices consists therein that the two parts which, by their mutual displacement cause the range adjustment, are both formed by parts of the telescope, whereby it will be unnecessary to supply a separate elevating bar or separate sight carrier corresponding to said bar.

Without deviation from the subject matter of the invention, the sight parts A¹ and A³ might be rigidly connected with each other, so that only the reflector housing might be revoluble relative to the housing portion which supports the eye-piece-tube. Obviously the housing portion A³ must in the latter case not be rigidly secured to the arm B¹, but instead be revoluble thereto so that the central housing portion A¹ will be able to partake in each movement of the gun barrel. The illustrated embodiment of the invention possesses however the advantage, that the eye-piece-tube remains stationary with the gun barrel in any elevation and that the eye may therefore look through the eye-piece always in a horizontal direction.

Naturally the central housing portion A¹ of the panoramic telescope might also be applied directly on the cradle in the same manner as the socket of an ordinary sight, and in this case too, may be connected rigidly or revolubly with the housing portion, A³ which supports the eye-piece-tube.

I claim:

1. A telescopic gun sight having a lying panoramic sight, comprising an eye-piece rigidly mounted on a non-elevating part of the gun carriage, a reflector and a casing therefor, a carrier having an erecting prism and an objective, a housing mounted coaxially with said casing, said casing, carrier and housing being revoluble relatively to each other and to said eye-piece, a member positively connecting said housing with a part of the gun carriage that partakes in the elevation of the gun barrel, whereby said housing will receive angular movement synchronously with and in the same direction as the gun barrel.

2. A telescopic gun sight having a lying panoramic sight comprising an eye-piece rigidly mounted on a non-elevating part of the gun carriage, a reflector and a casing therefor, a housing mounted coaxially with said casing, said casing and housing being relatively revoluble, a combined objective and erecting prism carrier being revoluble at different speed relative to said housing coaxially with the axis of revolution of said reflector casing; a member positively connecting said housing with a part of the gun carriage that partakes in the gun elevation, whereby said housing will receive angular movement synchronously with and in the same direction as the gun barrel.

3. A telescopic gun sight having a lying panoramic sight comprising an eye-piece rigidly mounted in a part that partakes in the gun training, a reflector and a casing therefor, a combined objective and erecting prism carrier, a housing mounted coaxially with said casing, said casing, carrier, and housing being revoluble relatively to each other and to said eye-piece; a carrier for said reflector revolubly mounted within said casing around an axis which is perpendicular to the axis of revolution of said casing, a train of gear wheels between said combined carrier and said casing, whereby said combined carrier is revoluble at different speed but in the same direction relative to said housing and coaxially with the axis of revolution of said reflector casing, a member positively connecting said housing with a part of the gun carriage that partakes in the elevation of the gun barrel, whereby said housing will receive angular movement synchronously with and in the same direction as the gun barrel.

4. A telescopic gun sighting device having a lying panoramic sight, said sight comprising a housing containing a reflector and a housing portion connected coaxially with the reflector housing, said reflector housing and said housing portion forming two parts rotatable relatively to each other, one of these parts being provided with a range scale and the other with a mark, the housing portion having positive connection with a part of the gun partaking of the gun barrel elevation, and an eye-piece connected with the housing portion.

5. A telescopic gun sighting device having a lying panoramic sight, said sight comprising a casing containing a reflector, a first housing portion pivotally connected to the reflector casing and a second housing portion relatively to which the first housing portion is rotatable around an axis coinciding with the axis of rotation of the reflector casing, said second housing portion supporting an eye-piece carrier, the second housing portion being mounted on a non-elevating part of the gun carriage and the first housing portion having positive connection with a part of the gun carriage partaking of the gun barrel elevation, and a positive gearing connection between said first housing portion and said casing, whereby said first housing portion and the casing will receive angular movement synchronously with, and in the same direction as the gun barrel, the second housing portion being non-rotatable in the direction of the gun barrel elevation.

The foregoing specification signed at Bremen, Germany, this 27th day of October, 1913.

RICHARD SCHÜRMANN. [L.S.]

In presence of—
    HELEN NUFER,
    JULIUS FESTNER.